(12) United States Patent  
Hong et al.

(10) Patent No.: US 12,185,171 B2
(45) Date of Patent: Dec. 31, 2024

(54) POWER DETERMINING METHOD AND TERMINAL DEVICE (71) Applicant: VIVO MOBILE COMMUNICATION CO., LTD., Guangdong (CN)

(72) Inventors: Yue Hong, Guangdong (CN); Ningning Xie, Guangdong (CN); Yanliang Sun, Guangdong (CN); Yifan Li, Guangdong (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 396 days.

(21) Appl. No.: 17/583,475

(22) Filed: Jan. 25, 2022

(65) Prior Publication Data

US 2022/0150767 A1   May 12, 2022

Related U.S. Application Data

(63) Continuation of application No. PCT/CN2020/098247, filed on Jun. 24, 2020.

(30) Foreign Application Priority Data

Jul. 30, 2019   (CN) .......................... 201910696356.6

(51) Int. Cl.  
*H04W 36/00* (2009.01)  
*H04W 52/36* (2009.01)

(52) U.S. Cl.  
CPC ..... *H04W 36/0061* (2013.01); *H04W 52/367* (2013.01)

(58) Field of Classification Search  
CPC ......... H04W 36/0061; H04W 36/0072; H04W 36/0083; H04W 36/30; H04W 52/225;

(Continued)

(56) References Cited

U.S. PATENT DOCUMENTS 8,879,614 B2 * 11/2014 Maehata ............ H04W 52/367  
2013/0128760 A1 * 5/2013 Fujishima ............ H04W 72/04  
                                                                                                     370/252

(Continued)

FOREIGN PATENT DOCUMENTS

CN          104185202 A     12/2014  
CN          108934059 A     12/2018

(Continued)

OTHER PUBLICATIONS

"3rd Generation Partnership Project; Technical Specification Group Radio Access Network; NR•' User Equipment (UE) procedures in Idle mode and RRC Inactive state (Release 15)", 3GPP TS 38.304 V15.4.0 (Jun. 2019), Valbonne, France.

(Continued)

*Primary Examiner* — Lana N Le  
(74) *Attorney, Agent, or Firm* — Price Heneveld LLP (57) ABSTRACT

Embodiments of this disclosure provide a power determining method and a terminal device. The method includes: obtaining M target ratios, where each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1; and determining a target receive power value based on the M target ratios, where the target receive power value is a receive power value of the target receive antenna.

15 Claims, 4 Drawing Sheets

(58) Field of Classification Search
CPC .............. H04W 52/367; H04W 48/20; H04W 36/0085; H04B 7/0874; H04B 17/318; H04B 7/0632; H04B 17/309; H04B 17/345; H04B 7/0404; H04B 17/336; H04B 7/0802

See application file for complete search history.

(56) References Cited

U.S. PATENT DOCUMENTS

| | | | |
|---|---|---|---|
| 2014/0086293 A1 | 3/2014 | Koike | |
| 2014/0211656 A1* | 7/2014 | Hu | H04W 36/0085 370/252 |
| 2019/0081753 A1* | 3/2019 | Jung | H04B 7/0874 |
| 2020/0037385 A1* | 1/2020 | Park | H04W 48/20 |
| 2022/0361118 A1* | 11/2022 | Lee | H04W 52/367 |
| 2023/0319726 A1* | 10/2023 | Liu | H04W 52/225 |

FOREIGN PATENT DOCUMENTS

| | | |
|---|---|---|
| CN | 110493831 A | 11/2019 |
| EP | 2787662 A1 | 8/2014 |
| EP | 2858402 A1 | 8/2015 |
| WO | 2014157867 A1 | 10/2014 |

OTHER PUBLICATIONS

"3rd Generation Partnership Project; Technical Specification Group Radio Access Network; NR•' Physical layer measurements (Release 15)", 3GPP TS 38.215 V15.5.0 (Jun. 2019), Valbonne, France.

"3rd Generation Partnership Project; Technical Specification Group Radio Access Network; NR•' Physical layer procedures for data (Release 15)", 3GPP TS 38.214 V15.6.0 (Jun. 2019), Valbonne, France.

Alcatel-Lucent, "LC-MTC UE RSRP/RSRQ measurement requirements", 3GPP TSG-RAN WG4 Meeting #71 RRM AH, R4-71AH-0025, Beijing, P.R. China, Jun. 24-26, 2014.

\* cited by examiner

POWER DETERMINING METHOD AND TERMINAL DEVICE

CROSS-REFERENCE TO RELATED APPLICATIONS

The present application is a bypass continuation application of International Application No. PCT/CN2020/098247 filed on Jun. 24, 2020, which claims priority to Chinese Patent Application No. 201910696356.6, filed with the China National Intellectual Property Administration on Jul. 30, 2019 and entitled "POWER DETERMINING METHOD AND TERMINAL DEVICE", both of which are incorporated herein by reference in their entireties.

TECHNICAL FIELD

Embodiments of this disclosure relate to the field of communications technologies, and in particular, to a power determining method and a terminal device.

BACKGROUND

In a mobile communications system, to ensure quality of service transmission (for example, voice service transmission or data service transmission), a terminal device may select, based on S-criterion (that is, a camp cell selection reception level value Srxlev>0), a camp cell to camp on.

At present, a selection reception level value of a cell can be determined by measuring a reference signal received power (RSRP) of the cell and other parameters. The RSRP of the cell is typically obtained by linearly averaging receive powers of all logical antenna ports in a terminal device that have received the reference signal of the cell.

However, in the foregoing method, the RSRP of the cell is obtained by linearly averaging receive powers of a plurality of logical antenna ports. Therefore, the determined RSRP of the cell may differ greatly from an actual RSRP of the cell, in which case the terminal device may determine a cell that meets S-criterion as a cell that does not meet S-criterion, and then perform cell measurement and selection again. As a result, the terminal device cannot accurately select a cell to camp on.

SUMMARY

Embodiments of this disclosure provide a power determining method, to resolve the problem that the terminal device cannot accurately select a cell to camp on. To resolve the foregoing technical problem, this application is implemented as follows.

According to a first aspect, an embodiment of this disclosure provides a power determining method applied to a terminal device, where the method includes: obtaining M target ratios; and determining a target receive power value based on the M target ratios. The target receive power value is a receive power value of a target receive antenna, each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1.

According to a second aspect, an embodiment of this disclosure provides a terminal device, where the terminal device may include an obtaining module and a determining module. The obtaining module is configured to obtain M target ratios, where each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1. The determining module is configured to determine a target receive power value based on the M target ratios obtained by the obtaining module, where the target receive power value is a receive power value of the target receive antenna.

According to a third aspect, an embodiment of this disclosure provides a terminal device, where the terminal device includes a processor, a memory, and a computer program stored in the memory and capable of running on the processor, and when the computer program is executed by the processor, the steps of the power determining method according to the first aspect are implemented.

According to a fourth aspect, an embodiment of this disclosure provides a computer-readable storage medium, where the computer-readable storage medium stores a computer program, and when the computer program is executed by a processor, the steps of the power determining method according to the first aspect are implemented.

DESCRIPTION OF EMBODIMENTS

The following clearly and completely describes the technical solutions in the embodiments of this disclosure with reference to the accompanying drawings in the embodiments of this disclosure. Apparently, the described embodiments are merely some rather than all of the embodiments of this disclosure. All other embodiments that persons of ordinary skill in the art obtain without creative efforts based on the embodiments of this disclosure shall fall within the protection scope of this application.

The term "and/or" in this specification is an associative relationship for describing associated objects, indicating that three relationships may exist. For example, A and/or B may indicate three scenarios: A alone; A and B; and B alone. The symbol "/" herein indicates an "or" relationship of associated objects. For example, A/B means A or B.

The terms "first", "second", and so on herein are intended to distinguish between different objects but do not indicate a particular order of the objects. For example, a first preset formula, a second preset formula, and the like are used to distinguish between different preset formulas, and are not used to describe a specific sequence of the preset formulas.

In the embodiments of this disclosure, terms such as "an example" or "for example" are used to represent examples, illustrations, or explanations. Any embodiment or design solution described as "an example" or "for example" in the embodiments of this disclosure shall not be interpreted as being preferred or advantageous over other embodiments or design solutions. Specifically, the terms such as "an example" or "for example" are used to present related concepts in a specific manner.

In the descriptions of the embodiments of this disclosure, "a plurality or means two or more, unless otherwise specified. For example, a plurality of" elements means two or more elements.

Embodiments of this disclosure provide a power determining method and a terminal device. M target ratios may be obtained (where each of the target ratios is a ratio of one of M target power values to a maximum target power value, the maximum target power value is a maximum value of the M target power values, the M target power values are receive power values of M logical antenna ports, and the M logical antenna ports are logical antenna ports of a target receive antenna of the terminal device); and a target receive power value is determined based on the M target ratios (where the target receive power value is a receive power value of the target receive antenna). With this solution, each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios. In this way, the states of the logical antenna ports of the transmitter are considered in determining the receive power value of the target receive antenna of the terminal device in the embodiments of this disclosure, so that the determined receive power value of the target receive antenna (that is, the target receive power value) is more approximate to an actual receive power value of the target receive antenna, meaning that the target receive power value can accurately reflect signal coverage strength of a cell measured by the terminal device. This allows the terminal device to accurately determine whether the cell satisfies a camping condition, thereby ensuring that the terminal device can accurately select a camp cell.

The terminal device in this embodiment of this disclosure may be a mobile terminal or a non-mobile terminal. For example, the mobile terminal may be a mobile phone, a tablet computer, a notebook computer, a palmtop computer, an in-vehicle terminal device, a wearable device, an ultra-mobile personal computer (UMPC), a netbook, a personal digital assistant (PDA), or the like. The non-mobile terminal may be a personal computer (PC), a television (TV), a teller machine, a self-service machine, or the like. This is not specifically limited in the embodiments of this disclosure.

The power determining method provided in this embodiment of this disclosure may be executed by the foregoing terminal device, or by a functional module and/or functional entity capable of implementing the power determining method in the terminal device, which may be specifically determined depending on an actual use requirement and is not limited in the embodiments of this disclosure. The terminal device is used as an example below to illustrate the power determining method provided in the embodiments of this disclosure.

In this embodiment of this disclosure, when the terminal device is powered on, changes from a connected state to an idle state, or enters a serving cell again, the terminal device needs to select a cell to camp on. During camp cell selection, the terminal device needs to first obtain a receive power value of the cell (that is, a receive power value of the terminal device in the cell), and determine, based on S-criterion and the receive power value, whether the cell meets a camping condition, so as to determine whether to camp on the cell. Specifically, the terminal device may obtain receive power values of different receive antennas of the terminal device, and determine a maximum receive power value of such receive power values as the receive power value of the cell, and then the terminal device may determine, based on S-criterion and the receive power value of the cell, whether the cell meets the camping condition. In a case that the cell meets the camping condition, the terminal device may select the cell to camp on; in a case that the cell does not meet the camping condition, the terminal device may search for another cell to camp on. Each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios. In this way, the states of the logical antenna ports of the transmitter are considered in determining the receive power value of the target receive antenna of the terminal device in the embodiments of this disclosure, so that the determined receive power value of the target receive antenna (that is, the target receive power value) is more approximate to an actual receive power value of the target receive antenna, meaning that the target receive power value can accurately reflect signal coverage strength of a cell measured by the terminal device. This allows the terminal device to accurately determine whether the cell satisfies a camping condition, thereby ensuring that the terminal device can accurately select a camp cell.

The following illustrates the power determining method provided in the embodiments of this disclosure with reference to the accompanying drawings.

Figure 1:
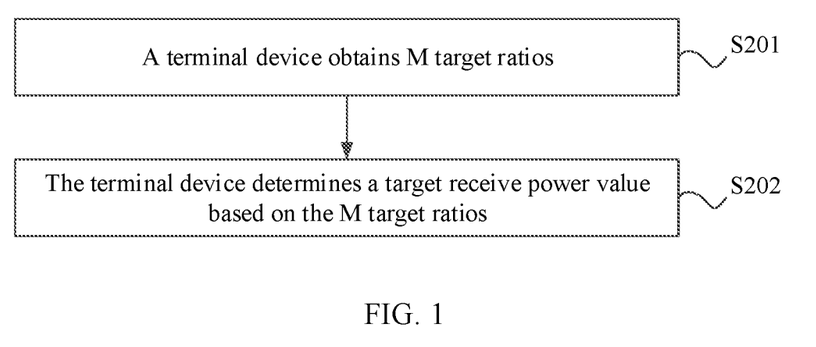
FIG. 1 is a first schematic diagram of a power determining method according to an embodiment of this disclosure.

As shown in FIG. 1, an embodiment of this disclosure provides a power determining method, and the method may include the following steps S201 and S202.

S201: A terminal device obtains M target ratios.

Each of the target ratios may be a ratio of one of M target power values to a maximum target power value, the maximum target power value may be a maximum value of the M target power values, the M target power values may be receive power values of M logical antenna ports, that is, each target power value is a receive power value of one logical antenna port, the M logical antenna ports may be logical antenna ports of a target receive antenna of the terminal device, and M is an integer greater than 1.

In this embodiment of this disclosure, the terminal device may have a plurality of receive antennas (that is, physical antennas), each receive antenna may include a plurality of logical antenna ports, and different logical antenna ports may transmit different signals.

Optionally, in this embodiment of this disclosure, the foregoing target receive antenna may be any one of the plurality of receive antennas.

Optionally, in this embodiment of this disclosure, the receive power value of the foregoing one logical antenna port may be a power value of a signal received by the logical antenna port. The signal may be a reference signal of a cell measured by the terminal device.

For example, assuming that the target receive antenna of the terminal device includes five logical antenna ports (that is, M=5), that receive power values of the five logical antenna ports are respectively denoted as P(1), P(2), P(3), P(4), P(5), and that P(1) is a maximum value of the receive power values of the five logical antenna ports, the terminal device may obtain, based on the receive power values of the five logical antenna ports, five target ratios that are respectively denoted as $P_{ratio}(1)$, $P_{ratio}(2)$, $P_{ratio}(3)$, $P_{ratio}(4)$, $P_{ratio}(5)$, where $$P_{ratio}(1) = \frac{P(1)}{P(1)}, P_{ratio}(2) = \frac{P(2)}{P(1)},$$

$$P_{ratio}(3) = \frac{P(3)}{P(1)}, P_{ratio}(4) = \frac{P(4)}{P(1)}, P_{ratio}(5) = \frac{P(5)}{P(1)}.$$

S202: The terminal device determines a target receive power value based on the M target ratios.

The target receive power value is a receive power value of the target receive antenna.

Optionally, in this embodiment of this disclosure, the target receive power value, that is, the receive power value of the target receive antenna, may be any possible receive power value such as an RSRP value or a received signal strength indicator (RSSI) value, which may be specifically determined depending on an actual use requirement and is not limited in the embodiments of this disclosure.

Optionally, in this embodiment of this disclosure, after the terminal device obtains the M target ratios, the terminal device may sequentially compare the M target ratios with a preset threshold. In a case that all of the M target ratios are less than a specific threshold, the terminal device may determine the target receive power value by using the following first preset formula; and in a case that any one of the M target ratios is greater than or equal to a specific threshold, the terminal device may determine the target receive power value by using the following second preset formula.

Figure 2:
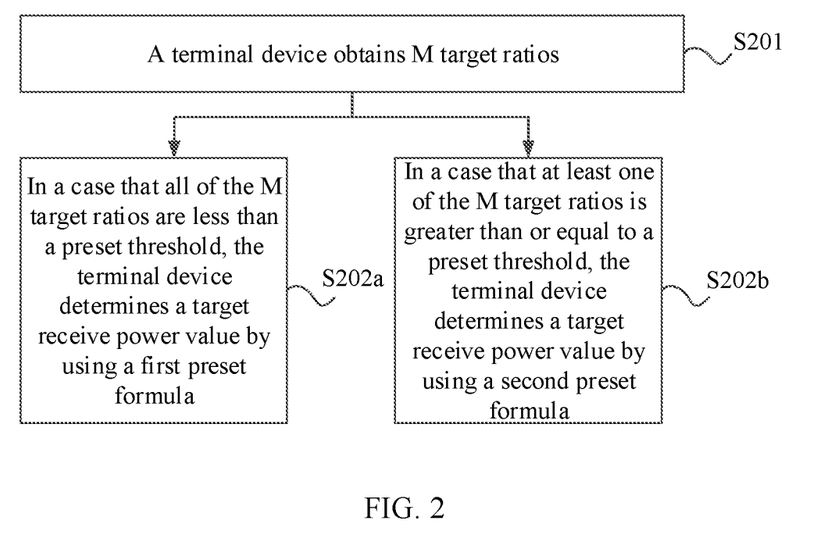
FIG. 2 is a second schematic diagram of a power determining method according to an embodiment of this disclosure.

For example, in this embodiment of this disclosure, with reference to FIG. 1, as shown in FIG. 2, the foregoing S202 may be specifically implemented by the following steps S202a and S202b.

S202a: In a case that all of the M target ratios are less than a preset threshold, the terminal device determines the target receive power value by using a first preset formula.

It should be noted that, in this embodiment of this disclosure, each of the M target ratios is a ratio of one target power value to a maximum target power value, that is, and each target ratio may represent a degree of approximation between each target power value and the maximum target power value. Therefore, states of logical antenna ports of a signal transmitter (for example, a network device) may be determined based on the M target ratios. Furthermore, in a case that all of the M target ratios are less than the preset threshold, it can be understood that each target power value is relatively approximate to the maximum target power value, and the terminal device may determine that the logical antenna ports of the transmitter are all in a non-mute state currently, that is, all the logical antenna ports of the transmitter can transmit signals normally. Alternatively, in a case that at least one of the M target ratios is less than or equal to the preset threshold, it can be understood that the at least one of the M target ratios differs significantly from the maximum target power value, and the terminal device may determine that at least one of all the logical antenna ports of the transmitter is in a mute state, that is, the at least one of all the logical antenna ports of the transmitter cannot transmit a signal normally.

Optionally, in this embodiment of this disclosure, the preset threshold may be specifically determined depending on an actual use requirement, and is not limited in the embodiments of this disclosure.

Optionally, in this embodiment of this disclosure, the first preset formula may be:

$$P = 10 * \log_{10}^{(\sum_{i=1}^{M} P(i)/M)},$$

where

P is the target receive power value, P(i) is an i-th target power value of the M target power values, M is the number of logical antenna ports on the target receive antenna, and $1 \leq i \leq M$.

For example, the data enumerated in the foregoing S201 is used as an example. Assuming that five target ratios are respectively denoted as $P_{ratio}(1)$, $P_{ratio}(2)$, $P_{ratio}(3)$, $P_{ratio}(4)$, $P_{ratio}(5)$, in a case that $P_{ratio}(1)$, $P_{ratio}(2)$, $P_{ratio}(3)$, $P_{ratio}(4)$, $P_{ratio}(5)$ are all less than the preset threshold, the terminal device may calculate the target receive power value of the target receive antenna, $P=10*\log_{10}^{P_{ratio}(mean)}$ according to the first preset formula, where $$P_{ratio}(mean) = \frac{P_{ratio}(1) + P_{ratio}(2) + P_{ratio}(3) + P_{ratio}(4) + P_{ratio}(5)}{5}.$$

S202b: In a case that at least one of the M target ratios is greater than or equal to a preset threshold, the terminal device determines the target receive power value by using a second preset formula.

Optionally, in this embodiment of this disclosure, the second preset formula may be:

$$P = \sum_{i=1}^{M} F_i(P_{ratio}(1), \ldots, P_{ratio}(i), \ldots, P_{ratio}(M)) * 10 * \log_{10}^{(P(i))},$$

where

P is the target receive power value, $P_{ratio}(i)$ is an i-th target ratio of the M target ratios, $F_i(P_{ratio}(1), \ldots, P_{ratio}(i), \ldots P_{ratio}(M))$ is a conversion function, P(i) is an i-th target power value of the M target power values, M is the number of signals received by the target receive antenna, and $1 \leq i \leq M$.

In this embodiment of this disclosure, $F_i(P_{ratio}(1), \ldots, P_{ratio}(i), \ldots P_{ratio}(M))$ is a conversion function, which can be used to convert M target ratios ($P_{ratio}(1), \ldots, P_{ratio}(i), \ldots P_{ratio}(M)$) into M weighting coefficients. For example, if M target ratio values ($P_{ratio}(1), \ldots, P_{ratio}(i), \ldots P_{ratio}(M)$) are input, M weighting coefficients can be output. Each weighting coefficient is a decimal between 0 and 1.

For example, the data enumerated in the foregoing S201 is used as an example. Assuming that five target ratios are respectively recorded as $P_{ratio}(1)$, $P_{ratio}(2)$, $P_{ratio}(3)$, $P_{ratio}(4)$, $P_{ratio}(5)$, in a case that at least one of $P_{ratio}(1)$, $P_{ratio}(2)$, $P_{ratio}(3)$, $P_{ratio}(4)$, $P_{ratio}(5)$ is greater than or equal to a preset threshold, the terminal device may calculate the target receive power value $P=F_1*10*\log_{10}^{P(1)}+F_2*10*\log_{10}^{P(2)}+$ $F_3*10*\log_{10}{}^{P(3)}+F_4*10*\log_{10}{}^{P(4)}+F_5*10*\log_{10}{}^{P(5)}$ by using the second preset formula, where $F_1$, $F_2$, $F_3$, $F_4$, $F_5$ can be obtained by inputting all of $P_{ratio}(1)$, $P_{ratio}(2)$, $P_{ratio}(3)$, $P_{ratio}(4)$, $P_{ratio}(5)$ into the conversion function, and each of $F_1$, $F_2$, $F_3$, $F_4$, $F_5$ is a decimal between 0 and 1.

In this embodiment of this disclosure, each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios. In this way, the states of the logical antenna ports of the transmitter are considered in determining the receive power value of the target receive antenna of the terminal device in the embodiments of this disclosure, so that the determined receive power value of the target receive antenna (that is, the target receive power value) is more approximate to an actual receive power value of the target receive antenna, meaning that the target receive power value can accurately reflect signal coverage strength of a cell measured by the terminal device. This allows the terminal device to accurately determine whether the cell satisfies a camping condition, thereby ensuring that the terminal device can accurately select a camp cell.

Optionally, in this embodiment of this disclosure, before obtaining M target ratios, the terminal device may first obtain M target power values, and then obtain the M target ratios based on the M target power values.

Figure 3:
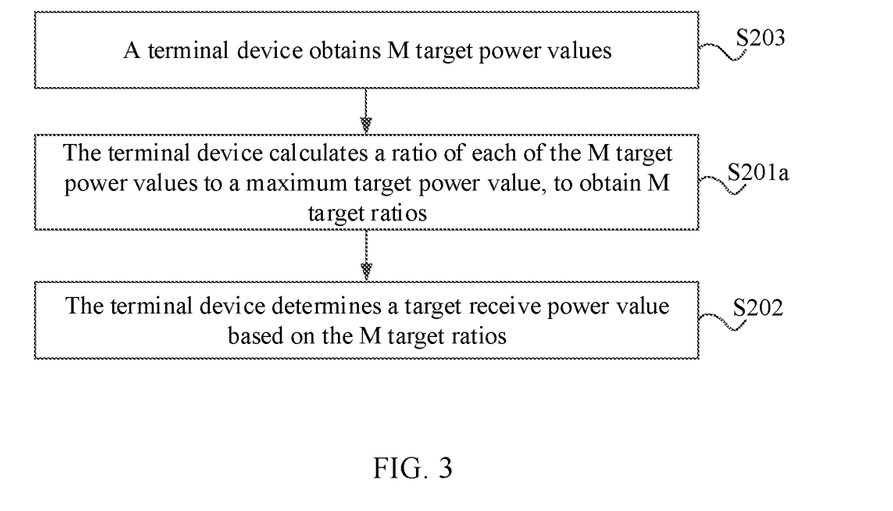
FIG. 3 is a third schematic diagram of a power determining method according to an embodiment of this disclosure.

For example, in this embodiment of this disclosure, with reference to FIG. 1, as shown in FIG. 3, before the foregoing S201, the power determining method provided in this embodiment of this disclosure may further include the following S203, and the foregoing S201 may be specifically implemented by the following S201a.

S203: The terminal device obtains M target power values.

In this embodiment of this disclosure, for the description of the foregoing target power values, reference may be made to the relevant description of the M target power values in the foregoing S201. To avoid repetition, details are not described herein again.

S201a: The terminal device calculates a ratio of each of the M target power values to a maximum target power value, to obtain M target ratios.

In this embodiment of this disclosure, after the terminal device obtains the M target power values, the terminal device may determine a maximum value of the M target power values, and then may determine M target ratios based on the M target power values and the maximum value of the M target power values. To be specific, the terminal device calculates a ratio of each of the M target power values to the maximum value of the M target power values separately, to obtain the M target ratios. It can be understood that one target power value may correspond to one target ratio.

In this embodiment of this disclosure, for other descriptions of the target ratios, reference may be made to the relevant description of the target ratios in the foregoing S201. To avoid repetition, details are not described herein again.

In this embodiment of this disclosure, each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios, so that the target power values determined based on the target ratios is more accurate.

Optionally, in this embodiment of this disclosure, the foregoing S203 may be specifically implemented by the following steps S203a and S203b.

S203a: The terminal device obtains M average power values.

Each of the M average power values may be an average receive power value of one of M logical antenna ports within a target range. Specifically, the average receive power value of one logical antenna port within the target range can be understood as an average power value of a signal received by the logical antenna port within the target range.

Optionally, in this embodiment of this disclosure, the foregoing target range may be target duration or a target bandwidth. Specifically, each of the M average power values may be an average power value of a signal received by one logical antenna port within the target duration; or each of the M average power values may be an average power value of a signal received by one logical antenna port within the target bandwidth. This may be specifically determined based on an actual requirement, and is not limited in the embodiments of this disclosure.

Optionally, in this embodiment of this disclosure, the target duration may be any duration that meets an actual use requirement, and may be specifically determined depending on the actual use requirement and is not limited in the embodiments of this disclosure.

Optionally, in this embodiment of this disclosure, the target bandwidth may be a system bandwidth or any bandwidth of the system bandwidth that meets an actual use requirement, which may be specifically determined depending on the actual use requirement and is not limited in the embodiments of this disclosure.

For example, assuming that the target receive antenna of the terminal device includes five logical antenna ports, that the target duration is 0.01 h (hour), and that powers of signals received by the five logical antenna ports of the target receive antenna within 0.01 h are denoted as $P_{total}(1)$, $P_{total}(2)$, $P_{total}(3)$, $P_{total}(4)$, $P_{total}(5)$, the terminal device may obtain five average power values, namely $P_{mean}(1)$, $P_{mean}(2)$, $P_{mean}(3)$, $P_{mean}(4)$, $P_{mean}(5)$, where $$P_{mean}(1) = \frac{P_{total}(1)}{0.01}, P_{mean}(2) = \frac{P_{total}(2)}{0.01},$$

$$P_{mean}(3) = \frac{P_{total}(3)}{0.01}, P_{mean}(4) = \frac{P_{total}(4)}{0.01}, P_{mean}(5) = \frac{P_{total}(5)}{0.01}.$$

S203b. The terminal device uses the M average power values as the M target power values.

In this embodiment of this disclosure, after the terminal device obtains the M average power values, the terminal device may use the M average power values as the M target power values.

For example, the data in the foregoing S203a and S201 is used as an example. After the terminal device obtains five average power values $P_{mean}(1)$, $P_{mean}(2)$, $P_{mean}(3)$, $P_{mean}(4)$, $P_{mean}(5)$, the terminal device may use $P_{mean}(1)$, $P_{mean}(2)$, $P_{mean}(3)$, $P_{mean}(4)$ as P(4), and $P_{mean}(5)$ as P(5), that is, $$P(1) = P_{mean}(1) = \frac{P_{total}(1)}{0.01},$$

-continued $$P(2) = P_{mean}(2) = \frac{P_{total}(2)}{0.01}, P(3) = P_{mean}(3) = \frac{P_{total}(3)}{0.01},$$

$$P(4) = P_{mean}(4) = \frac{P_{total}(4)}{0.01}, P(5) = P_{mean}(5) = \frac{P_{total}(5)}{0.01}.$$

In this embodiment of this disclosure, each of the target power values is an average power value of one logical antenna port of the target receive antenna of the terminal device within the target duration or target bandwidth. Therefore, the target power values obtained by the terminal device can accurately represent a magnitude of the power received by the logical antenna port, so that the target ratios determined by the terminal device based on the target power values is more accurate.

Optionally, in this embodiment of this disclosure, in a case that the terminal device includes a plurality of receive antennas (for example, N receive antennas), the terminal device determines a receive power value of each of the N receive antennas, so as to obtain a plurality of receive power values. Moreover, after the terminal device determines a plurality of receive power values, the terminal device may determine, based on a maximum receive power value in the plurality of receive power values and S-criterion, whether a target cell meets a camping condition.

Figure 4:
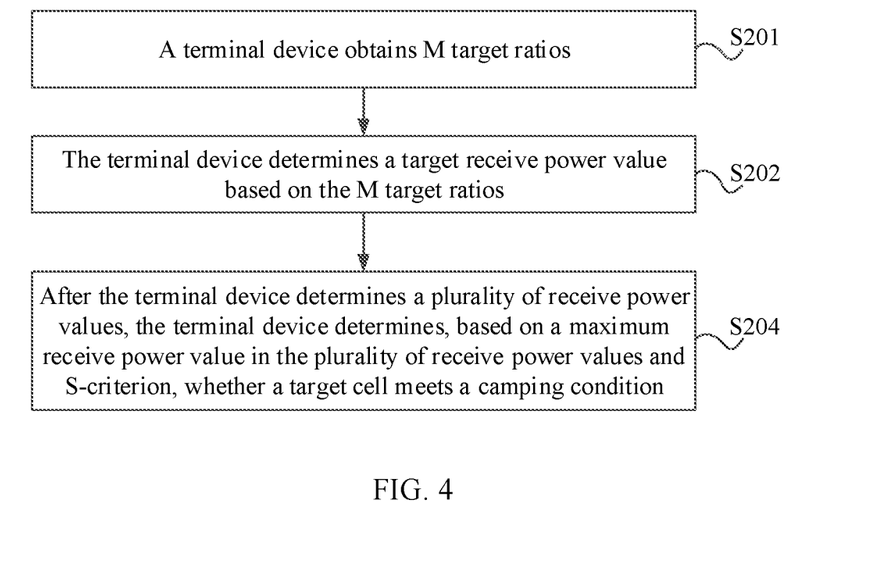
FIG. 4 is a fourth schematic diagram of a power determining method according to an embodiment of this disclosure.

For example, in this embodiment of this disclosure, with reference to FIG. 1, as shown in FIG. 4, after the foregoing S202, the power determining method provided in this embodiment of this disclosure may further include the following S204.

S204: After the terminal device determines a plurality of receive power values, the terminal device determines, based on a maximum receive power value in the plurality of receive power values and S-criterion, whether a target cell meets a camping condition.

The foregoing target cell is a cell measured by the terminal device, and the foregoing plurality of receive power values are receive power values of the plurality of receive antennas. To be specific, each receive power value in the plurality of receive power values is a receive power value of one of the plurality of receive antennas.

In this embodiment of this disclosure, when the target receive antenna of the terminal device is provided in plurality, the terminal device may execute the power determining method provided in this embodiment of this disclosure for each receive antenna of the terminal device, to determine a receive power value of each receive antenna in the plurality of receive antennas, so as to obtain a plurality of receive power values. Moreover, after the terminal device determines a plurality of receive power values, the terminal device may determine, based on a maximum receive power value in the plurality of receive power values and S-criterion, whether a target cell meets a camping condition. In a case that the terminal device determines that the target cell meets the camping condition, the terminal device may initiate a network camping request to the target cell; and in a case that the terminal device determines the target cell does not meet the camping condition, the terminal device may search for another cell to camp on.

In this embodiment of this disclosure, the terminal device determines, based on a maximum receive power value in the plurality of receive antennas and S-criterion, whether the target cell meets the camping condition, so that the determining result is accurate.

It should be noted that, in the embodiments of this disclosure, the foregoing power determining methods shown in the method drawings are all exemplified with reference to one of the accompanying drawings in the embodiments of this disclosure. During specific implementation, the foregoing power determining methods shown in the method accompanying drawings can also be implemented with reference to any other accompanying drawings that can be combined as illustrated in the foregoing embodiments, and details are not described herein.

Figure 5:
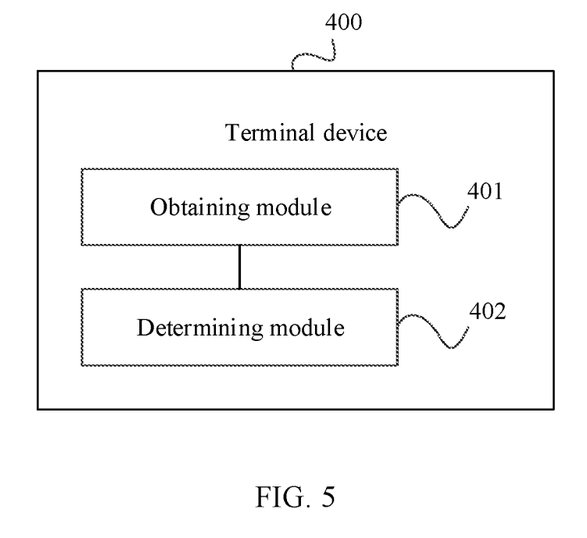
FIG. 5 is a first schematic structural diagram of a terminal device according to an embodiment of this disclosure.

As shown in FIG. 5, an embodiment of this disclosure provides a terminal device 400, where the terminal device may include an obtaining module 401 and a determining module 402. The obtaining module 401 may be configured to obtain M target ratios, where each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1. The determining module 402 may be configured to determine a target receive power value based on the M target ratios obtained by the obtaining module 401, where the target receive power value is a receive power value of the target receive antenna.

Optionally, in this embodiment of this disclosure, the determining module 402 is specifically configured to, in a case that all of the M target ratios are less than a preset threshold, determine the target receive power value by using a first preset formula; or in a case that any one of the M target ratios is greater than or equal to a preset threshold, determine the target receive power value by using a second preset formula.

Optionally, in this embodiment of this disclosure, the first preset formula may be:

$$P = 10 * \log_{10}^{(\sum_{i=1}^{M} P(i)/M)},$$

where P is the target receive power value, P(i) is an i-th target power value of the M target power values, M is the number of signals received by the target receive antenna, and 1≤i≤M.

Optionally, in this embodiment of this disclosure, the second preset formula may be:

$$P = \sum_{i=1}^{M} F_i(P_{ratio}(1), \ldots, P_{ratio}(i), \ldots, P_{ratio}(M)) * 10 * \log_{10}^{(P(i))},$$

where P is the target receive power value, $P_{ratio}(i)$ is an i-th target ratio of the M target ratios, $F_i(P_{ratio}(1), \ldots, P_{ratio}(i), \ldots P_{ratio}(M))$ is a conversion function, P(i) is an i-th target power value of the M target power values, M is the number of signals received by the target receive antenna, and 1≤i≤M.

Optionally, in this embodiment of this disclosure, the obtaining module 401 may be further configured to obtain M target power values before obtaining the M target ratios; and the obtaining module 401 is specifically configured to calculate a ratio of each of the M target power values to the maximum target power value, to obtain the M target ratios.

Optionally, in this embodiment of this disclosure, the obtaining module 401 is specifically configured to obtain M average power values, and use the M average power value as the M target power values, where each average power value may be an average receive power value of one of the M logical antenna ports within a target range, and the target range may be target duration or a target bandwidth.

Figure 6:
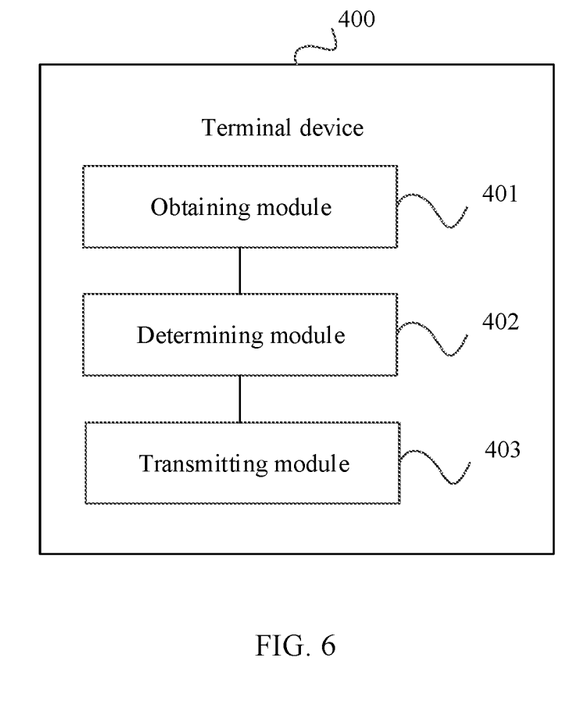
FIG. 6 is a second schematic structural diagram of a terminal device according to an embodiment of this disclosure.

Optionally, with reference to FIG. 5, as shown in FIG. 6, in this embodiment of this disclosure, the target receive antenna may be any one of a plurality of receive antennas, and the terminal device further includes a transmitting module 403, configured to, after the determining module 402 determines a plurality of receive power values, determine, based on a maximum receive power value in the plurality of receive power values and S-criterion, whether a target cell meets a camping condition, where the target cell is a cell measured by the terminal device, and the plurality of receive power values are receive power values of the plurality of receive antennas.

An embodiment of this disclosure provides a terminal device. The terminal device may obtain M target ratios (where each of the target ratios is a ratio of one of M target power values to a maximum target power value, the maximum target power value is a maximum value of the M target power values, the M target power values are receive power values of M logical antenna ports, and the M logical antenna ports are logical antenna ports of a target receive antenna of the terminal device); and determine a target receive power value based on the M target ratios (where the target receive power value is a receive power value of the target receive antenna). With this solution, each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios. In this way, the states of the logical antenna ports of the transmitter are considered in determining the receive power value of the target receive antenna of the terminal device in the embodiments of this disclosure, so that the determined receive power value of the target receive antenna (that is, the target receive power value) is more approximate to an actual receive power value of the target receive antenna, meaning that the target receive power value can accurately reflect signal coverage strength of a cell measured by the terminal device. This allows the terminal device to accurately determine whether the cell satisfies a camping condition, thereby ensuring that the terminal device can accurately select a camp cell.

Figure 7:
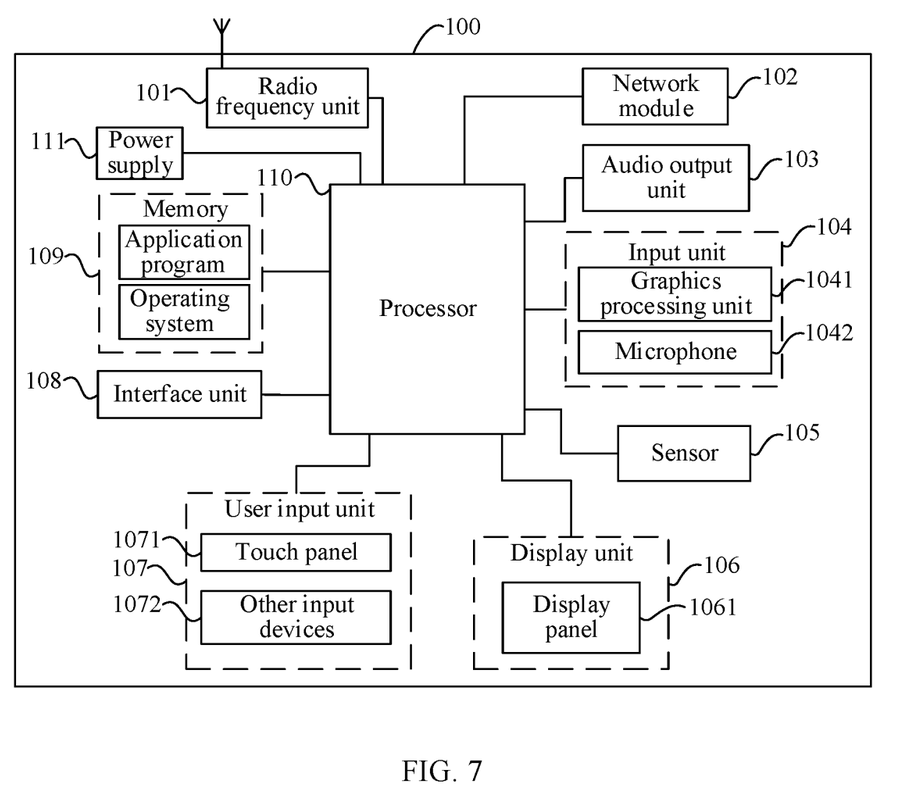
FIG. 7 is a schematic diagram of hardware of a terminal device according to an embodiment of this disclosure.

FIG. 7 is a schematic diagram of a hardware structure of a terminal device for implementing the embodiments of this disclosure. As shown in FIG. 7, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the terminal device is not limited to the terminal device structure shown in FIG. 7. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal, a wearable device, a pedometer, and the like.

The processor 110 may be configured to obtain M target ratios, and determine a target receive power value based on the M target ratios. Each of the target ratios is a ratio of one of M target power values to a maximum target power value, the maximum target power value is a maximum value of the M target power values, the M target power values are power values of M signals received by a target receive antenna of the terminal device, and the target receive power value is a receive power value of the target receive antenna.

It can be understood that, in this embodiment of this disclosure, the obtaining module 401 and the determining module 402 in the foregoing schematic structural diagram (for example, FIG. 5) of the terminal device may be implemented by the processor 110. The transmitting module 403 in the foregoing schematic structural diagram (for example, FIG. 6) of the terminal device may be implemented by the radio frequency unit 101.

An embodiment of this disclosure provides a terminal device. The terminal device may obtain M target ratios (where each of the target ratios is a ratio of one of M target power values to a maximum target power value, the maximum target power value is a maximum value of the M target power values, the M target power values are receive power values of M logical antenna ports, and the M logical antenna ports are logical antenna ports of a target receive antenna of the terminal device); and determine a target receive power value based on the M target ratios (where the target receive power value is a receive power value of the target receive antenna). With this solution, each of the M target ratios is a ratio of one target power value to a maximum target power value, that is, each target ratio may represent a degree of approximation between each target power value and the maximum target power value. Therefore, states of logical antenna ports of a signal transmitter (for example, a network device) may be determined based on the M target ratios. In this way, the states of the logical antenna ports of the transmitter are considered in determining the receive power value of the target receive antenna of the terminal device in the embodiments of this disclosure, so that the determined receive power value of the target receive antenna (that is, the target receive power value) is more approximate to an actual receive power value of the target receive antenna, meaning that the target receive power value can accurately reflect signal coverage strength of a cell measured by the terminal device. This allows the terminal device to accurately determine whether the cell satisfies a camping condition, thereby ensuring that the terminal device can accurately select a camp cell.

It should be understood that, in this embodiment of this disclosure, the radio frequency unit 101 may be configured to send or receive a signal in an information sending/receiving or call process. Specifically, the radio frequency unit 101 receives downlink data from a base station and transmits the downlink data to the processor 110 for processing; and transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The terminal device provides wireless broadband Internet access for a user by using the network module 102, for example, helping the user transmit and receive E-mail, browse web pages, and access streaming media.

The audio output unit 103 may convert audio data into an audio signal, and output the audio signal as sound, where the audio data is received by the radio frequency unit 101 or the network module 102, or stored in the memory 109. In addition, the audio output unit 103 may also provide audio output (for example, a call signal received sound or a message received sound) related to a specific function performed by the terminal device 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042, and the graphics processing unit 1041 processes image data of a static picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted in a telephone call mode into a format that can be transmitted by the radio frequency unit 101 to a mobile communication base station, for outputting.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a motion sensor, an accelerometer sensor may detect magnitudes of an acceleration in various directions (usually three axes), may detect a magnitude and a direction of gravity when the terminal device is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate key signal input that is related to user setting and function control of the terminal device. Specifically, the user input unit 107 includes a touch panel 1071 and other input devices 1072. The touch panel 1071, also referred to as a touchscreen, may capture a touch operation performed by a user on or near the touch panel 1071 (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch of a user, detects a signal brought by a touch operation, and transmits the signal to the touch controller. The touch controller receives touch information from the touch detection apparatus, converts the touch information into touch point coordinates, transmits the touchpoint coordinates to the processor 110, and receives and executes a command transmitted by the processor 110. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (for example, a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 for determining a type of the touch event. Then, the processor 110 provides a corresponding visual output on the display panel 1061 based on the type of the touch event. In FIG. 7, the touch panel 1071 and the display panel 1061 serve as two separate components to implement input and output functions of the terminal device. However, in some embodiments, the touch panel 1071 and the display panel 1061 may be integrated to implement the input and output functions of the terminal device. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, an earphone port, or the like. The interface unit 108 may be configured to receive an input (for example, data information or electric power) from an external apparatus and transmit the received input to one or more elements within the terminal device 100, or may be configured to transmit data between the terminal device 100 and the external apparatus.

The memory 109 may be configured to store software programs and various data. The memory 109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 109 may include a high-speed random access memory, and may further include a non-volatile memory such as a disk storage device, a flash memory device, or another volatile solid-state storage device.

The processor 110 is a control center of the terminal device, which uses various interfaces and lines to connect all parts of the entire terminal device and performs various functions and data processing of the terminal device by running or executing the software programs and/or modules stored in the memory 109 and invoking data stored in the memory 109, so as to perform overall monitoring on the terminal device. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may alternatively be not integrated in the processor 110.

The terminal device 100 may further include the power supply 111 (for example, a battery) that supplies power to the components. Optionally, the power supply 111 may be logically connected to the processor 110 through a power management system, so as to implement functions such as charging management, discharging management, and power consumption management through the power management system.

In addition, the terminal device 100 includes some functional modules that are not shown. Details are not described herein.

Optionally, an embodiment of this disclosure further provides a terminal device, including a processor 110, a memory 109, and a computer program stored in the memory 109 and capable of running on the processor 110. When the computer program is executed by the processor 110, the processes of the foregoing method embodiment are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing method embodiment are implemented, with the same technical effects achieved. To avoid repetition, details are not described herein again. The computer-readable storage medium may include a read-only memory (ROM), a random access memory (RAM), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this application essentially or the part contributing to the related art may be implemented in a form of a software product. The software product may be stored in a storage medium (for example, a ROM/RAM, a magnetic disk, or an optical disc), and includes several instructions for instructing a terminal device (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A power determining method, applied to a terminal device, wherein the method comprises:
obtaining M target ratios, wherein each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1; and
determining a target receive power value based on the M target ratios, wherein the target receive power value is a receive power value of the target receive antenna.

2. The method according to claim 1, wherein the determining a target receive power value based on the M target ratios comprises:
in a case that all of the M target ratios are less than a preset threshold, determining the target receive power value by using a first preset formula; or
in a case that at least one of the M target ratios is greater than or equal to a preset threshold, determining the target receive power value by using a second preset formula.

3. The method according to claim 2, wherein the first preset formula is:

$$P = 10*\log_{10}^{(\sum_{i=1}^{M} P(i)/M)},$$

wherein
P is the target receive power value, P(i) is an i-th target power value of the M target power values, M is the number of logical antenna ports on the target receive antenna, and $1 \leq i \leq M$.

4. The method according to claim 2, wherein the second preset formula is:

$$P = \sum_{i=1}^{M} F_i(P_{ratio}(1), \ldots, P_{ratio}(i), \ldots, P_{ratio}(M))*10*\log_{10}^{(P(i))},$$

wherein
P is the target receive power value, $P_{ratio}(i)$ is an i-th target ratio of the M target ratios, P $F_i(P_{ratio}(1), \ldots, P_{ratio}(i), \ldots P_{ratio}(M))$ is a conversion function, P(i) is an i-th target power value of the M target power values, M is the number of logical antenna ports on the target receive antenna, and $1 \leq i \leq M$.

5. The method according to claim 1, wherein before the obtaining M target ratios, the method further comprises:
obtaining the M target power values; and
the obtaining M target ratios comprises:
calculating a ratio of each of the M target power values to the maximum target power value, to obtain the M target ratios.

6. The method according to claim 5, wherein the obtaining the M target power values comprises:
obtaining M average power values, wherein each average power value is an average receive power value of one of the M logical antenna ports within a target range, and the target range is target duration or a target bandwidth; and
using the M average power values as the M target power values.

7. The method according to claim 1, wherein the target receive antenna is any one of a plurality of receive antennas, and the method further comprises:
after determining a plurality of receive power values, determining, based on a maximum receive power value in the plurality of receive power values and S-criterion, whether a target cell meets a camping condition, wherein the target cell is a cell measured by the terminal device, and the plurality of receive power values are receive power values of the plurality of receive antennas.

8. A non-transitory computer-readable storage medium, wherein the computer-readable storage medium stores a computer program, and when the computer program is executed by a processor, the steps of the power determining method according to claim 1 are implemented.

9. A terminal device, wherein the terminal device comprises a processor, a memory, and a computer program stored in the memory and capable of running on the processor, and when the computer program is executed by the processor, the following steps are implemented:
obtaining M target ratios, wherein each of the target ratios is a ratio of one of M target power values to a maximum target power value, the maximum target power value is a maximum value of the M target power values, the M target power values are receive power values of M logical antenna ports, the M logical antenna ports are logical antenna ports of a target receive antenna of the terminal device, and M is an integer greater than 1; and
determining a target receive power value based on the M target ratios, wherein the target receive power value is a receive power value of the target receive antenna.

10. The terminal device according to claim 9, wherein the determining a target receive power value based on the M target ratios comprises:
in a case that all of the M target ratios are less than a preset threshold, determining the target receive power value by using a first preset formula; or
in a case that at least one of the M target ratios is greater than or equal to a preset threshold, determining the target receive power value by using a second preset formula.

11. The terminal device according to claim 10, wherein the first preset formula is:

$$P = 10 * \log_{10}^{(\Sigma_{i=1}^{M} P(i)/M)},$$

wherein
P is the target receive power value, P(i) is an i-th target power value of the M target power values, M is the number of logical antenna ports on the target receive antenna, and 1≤i≤M.

12. The terminal device according to claim 10, wherein the second preset formula is:

$$P = \sum_{i=1}^{M} F_i(P_{ratio}(1), \ldots, P_{ratio}(i), \ldots, P_{ratio}(M)) * 10 * \log_{10}^{(P(i))},$$

wherein
P is the target receive power value, $P_{ratio}(i)$ is an i-th target ratio of the M target ratios, $F_i(P_{ratio}(1), \ldots, P_{ratio}(i), \ldots P_{ratio}(M))$ is a conversion function, P(i) is an i-th target power value of the M target power values, M is the number of logical antenna ports on the target receive antenna, and 1≤i≤M.

13. The terminal device according to claim 9, wherein before the obtaining M target ratios, the method further comprises:
obtaining the M target power values; and
the obtaining M target ratios comprises:
calculating a ratio of each of the M target power values to the maximum target power value, to obtain the M target ratios.

14. The terminal device according to claim 13, wherein the obtaining the M target power values comprises:
obtaining M average power values, wherein each average power value is an average receive power value of one of the M logical antenna ports within a target range, and the target range is target duration or a target bandwidth; and
using the M average power values as the M target power values.

15. The terminal device according to claim 9, wherein the target receive antenna is any one of a plurality of receive antennas, and the method further comprises:
after determining a plurality of receive power values, determining, based on a maximum receive power value in the plurality of receive power values and S-criterion, whether a target cell meets a camping condition, wherein the target cell is a cell measured by the terminal device, and the plurality of receive power values are receive power values of the plurality of receive antennas.

* * * * *